United States Patent [19]

Ito et al.

[11] Patent Number: 4,715,509
[45] Date of Patent: Dec. 29, 1987

[54] FUEL FILLER CONDUIT

[75] Inventors: Takaaki Ito; Eiji Mori; Koji Uranishi; Shinji Miyazaki; Junichi Sugimoto, all of Toyota, Japan

[73] Assignees: Toyota Jidosha Kabushiki Kaisha; Horie Metal Co., Ltd., both of Aichi, Japan

[21] Appl. No.: 884,154

[22] Filed: Jul. 10, 1986

[30] Foreign Application Priority Data

Jul. 31, 1985 [JP] Japan ............... 60-169613
Jul. 31, 1985 [JP] Japan ............... 60-169614
Jul. 31, 1985 [JP] Japan ............... 60-169615

[51] Int. Cl.$^4$ ............... B65B 31/06
[52] U.S. Cl. ............... 220/86 R; 141/59; 220/85 VS; 220/85 VR
[58] Field of Search ......... 220/86 R, 85 VR, 85 VS, 220/85 F; 141/59

[56] References Cited

U.S. PATENT DOCUMENTS

| 3,417,900 | 12/1968 | Landphair | ............... 220/86 R |
| 3,854,911 | 12/1974 | Walker . | |
| 3,884,204 | 5/1975 | Krautwurst . | |
| 3,907,153 | 9/1975 | Matty . | |
| 3,957,025 | 5/1976 | Heath . | |
| 4,572,394 | 2/1986 | Tanahashi . | |
| 4,630,749 | 12/1986 | Armstrong | ............... 220/86 R |
| 4,632,270 | 12/1986 | Sasaki | ............... 220/86 R |

FOREIGN PATENT DOCUMENTS 60-199729 10/1985 Japan .
61-27955 2/1986 Japan .
61-93320 6/1986 Japan .
61-141127 9/1986 Japan .

*Primary Examiner*—George E. Lowrance
*Attorney, Agent, or Firm*—Sughrue, Mion, Zinn, Macpeak & Seas

[57] ABSTRACT

Fuel filler conduit connected at one end with fuel reservoir for engine in automobile etc. has the free end exposed out of the body wall. When removing a cap engaging with said free end for fuel filling, fuel vapour therein is released in the atmosphere.

The invention provides a lid normally closing conduit inlet and adapted to be open by tip end of fuel dispensing nozzle. Angular movement of the lid actuates a valve normally closing an outlet to be open so that fuel vapour in the conduit is supplied from the outlet through a pipe to the engine.

4 Claims, 9 Drawing Figures

FUEL FILLER CONDUIT

FIELD OF THE INVENTION AND RELATED ART

This invention relates to a fuel filler conduit which is connected at one end with a fuel reservoir for internal combustion engine mounted in an automobile, motorboat, motorcycle or the like and has the other free end exposed out of the wall of the vehicle and arranged at any suitable portion of the vehicle body and normally gastightly closed by a cap which may be manually disengaged for fuel supply.

The fuel for the internal combustion engine is of a lower boiling point so as to be vapourized more or less in the fuel reservoir and the fuel filler conduit connected therewith. When the cap closing the open end of the conduit is disengaged therefrom the fuel is supplied in the reservoir, any fuel vapour therein is expelled as the fuel level is raised and released in the atmosphere through the conduit. This is not desirable in view of protection of environment, and saving useless loss of energy.

SUMMARY OF THE INVENTION

An object of the invention is, thus, to provide a fuel filler conduit adapted to be capable of preventing fuel vapour from being released in the atmosphere from the free open end thereof during the supply of fuel.

A fundamental object can be attained according to the invention by providing a fuel filled conduit connected with a fuel reservoir for the inner combustion engine at one end thereof and having the other free end normally closed by a cap, comprising a through hole for outletting fuel vapour and formed in the circumferential wall of the conduit, first valve means normally urged by spring means to be in a position for closing a port leading to said free open end, and second valve means normally urged by other spring means to be in a position for closing said fuel vapour outlet and so engaged with said first valve means that when a fuel supply nozzle gun is inserted in the conduit from said free open end said first valve means is opened by the tip of said nozzle against the force of said spring means, whereby said second valve means is opened against the force of said other spring means for allowing fuel vapour to pass through said outlet to be supplied to said engine for combustion.

Another object of the invention is to provide the fuel filler conduit having valve means each of simple construction to be readily assembled.

This object can be attained according to the invention by providing a cylindrical member having an upper open end to be closed by the cap and a lower open end defining said port, a bracket member to be fixed at one end on the wall of said cylindrical member to be suspended downwards therefrom, a first valve member pivoted on said bracket member so as to angularly move between a position for closing the port in which said valve member is normally kept by spring means and a position for opening the port in which the valve member is brought by the tip of a fuel supply gun inserted against the force of the spring means, and a second valve member pivoted on the bracket member so as to angularly move between a position for closing the through hole in which the valve member is normally kept by spring means and a position for opening the through hole in which the valve member is brought by engaging with the first valve member angularly moving to the closing position thereof.

The first valve member is preferably in the form of a pan-shaped body of a diameter larger than that of said port and having a pair of transversally projecting brackets which are pivoted on the bracket member.

The second valve member is preferably in the form of an elongated plate body having a pair of brackets at the middle of the elongation to be pivoted on said bracket member so that one end portion thereof may engage with the free ends of said brackets of the first valve member and when said first valve member is angularly moved to be in the open position said second valve member is angularly moved to be in the open position by said engagement with the bracket ends playing a role as cams. On the opposite end portion, there is preferably mounted or formed a semispherical body so as to abut on a valve seat formed in an annular member fitted in the through hole for closing.

The still other object of the invention is to provide a ball valve of such construction as referred to above in which the valve ball is adapted to be automatically moved to a correct closing position relative to the valve seat.

The object can be attained according to the invention by mounting the semispherical body on said elongated plate body with a foot downwardly projected from the hemispherical body passing a through hole of the diameter a little larger than that of the foot and formed in the plate body so as to allow the hemispherical body to freely move in the axial direction and urging the hemispherical body to abut on the valve seat by spring means.

BRIEF DESCRIPTION OF THE DRAWINGS

The invention will be explained in more detail in reference to an embodiment in reference to the attached drawings, in which.

DETAILED EXPLANATION OF THE INVENTION

Figure 6:
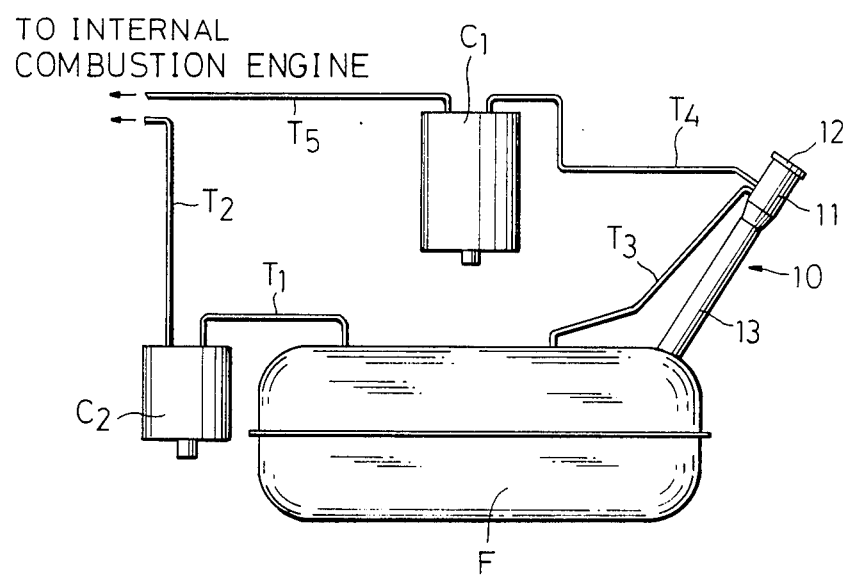
FIG. 6 is a schematic view showing the fuel filler conduit connected with a fuel reservoir and concerned tubes.

In reference firstly to FIG. 6, a fuel filler conduit according to the invention and represented generally by 10 has an upper portion 11 of a relatively engarged diameter, the free open end of which is exposed out of the body wall (not shown) of the inner combustion engine driven vehicle, e.g. the automobile and gastightly closed by a cap 12 and a lower portion 13 connected with a fuel reservoir F at the lower end thereof. The upper portion 11 may be of same diameter as that of the lower portion 13, or of smaller diameter than that of the lower portion 13.

Tubes $T_1$ and $T_2$ are arranged for feeding fuel vapour from said reservoir F to the engine (not shown) through a canister $C_2$ containing e.g. activated charcoal which once absorbs vapour to be supplied to the engine for combustion. Fuel vapour in the reservoir F is led to the upper portion 11 of the fuel filler conduit through a tube $T_3$ and then to the engine therefrom through tubes $T_4$ and $T_5$ preferably via a canister $C_1$ containing active charcoal arranged therebetween for the same purpose, according to the suction induced by the engine.

Figure 1:
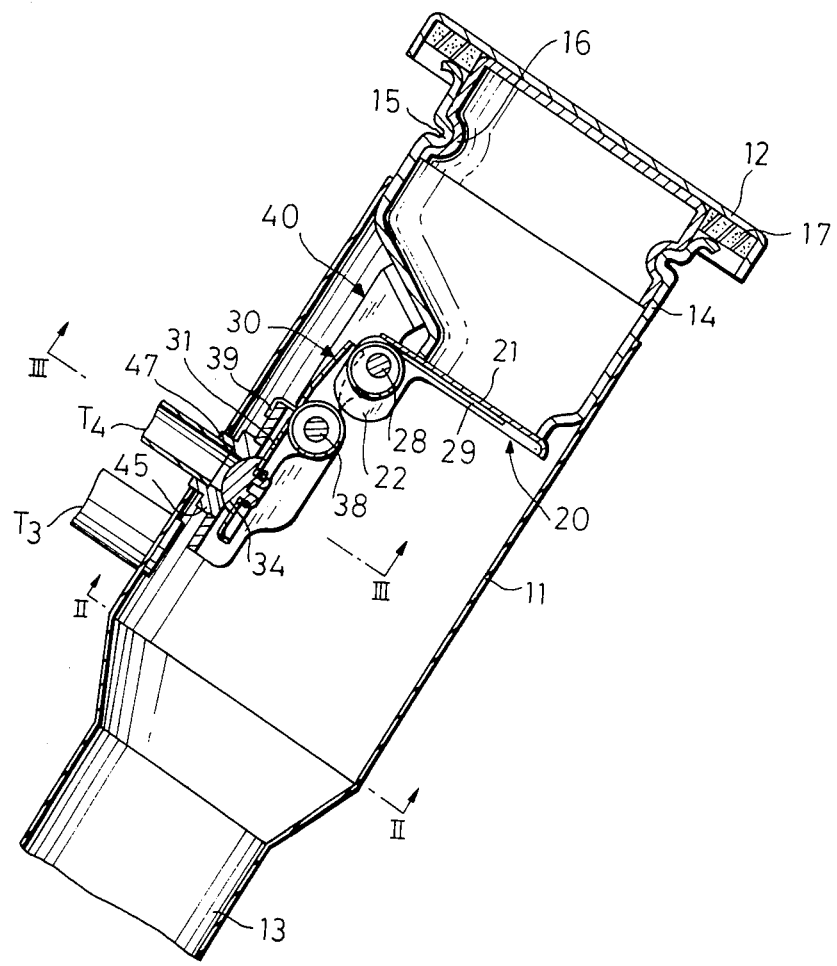
FIG. 1 is a longitudinal section of the fuel filler conduit according to the invention, of which lower portion is cut off for the sake of convenience.
Figure 2:
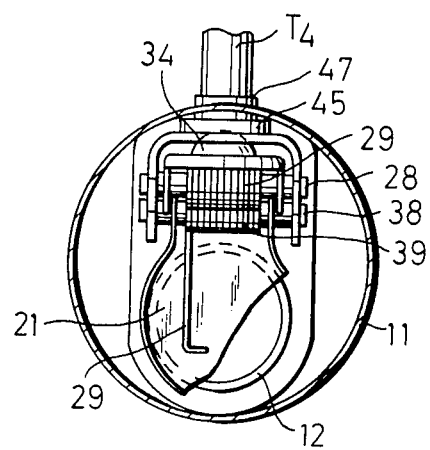
FIG. 2 is a section taken along a line II—II in FIG. 1.

Now in reference to FIG. 1, the open end of the upper conduit portion 11 has a separate cylindrical member 14 inserted therein and gastightly fixed therewith. The cylindrical member 14 has a lower open end to produce a port a little eccentrically arranged for the purpose of affording convinience to mount the valve means assembly which is the essential features of the invention therein. The upper open end of the cylindrical member 14 is gastightly closed by said cap 12. For that purpose, in the illustrated embodiment, said cap 12 has an inwardly protruded annular rib 15 to snappingly engage with a correspondingly protruded annular rib 16 of the cylindrical member 14 and a sealing annular member 17 arranged on the reverse side of the cap 12 so as to engage with the upper peripheral edge of said cylindrical member 14. Such gastight engagement may be attained by any other method, for instance by male and female threads formed in the walls of said cap and cylindrical member. Such engagement itself has no relation with the invention.

Figure 4:
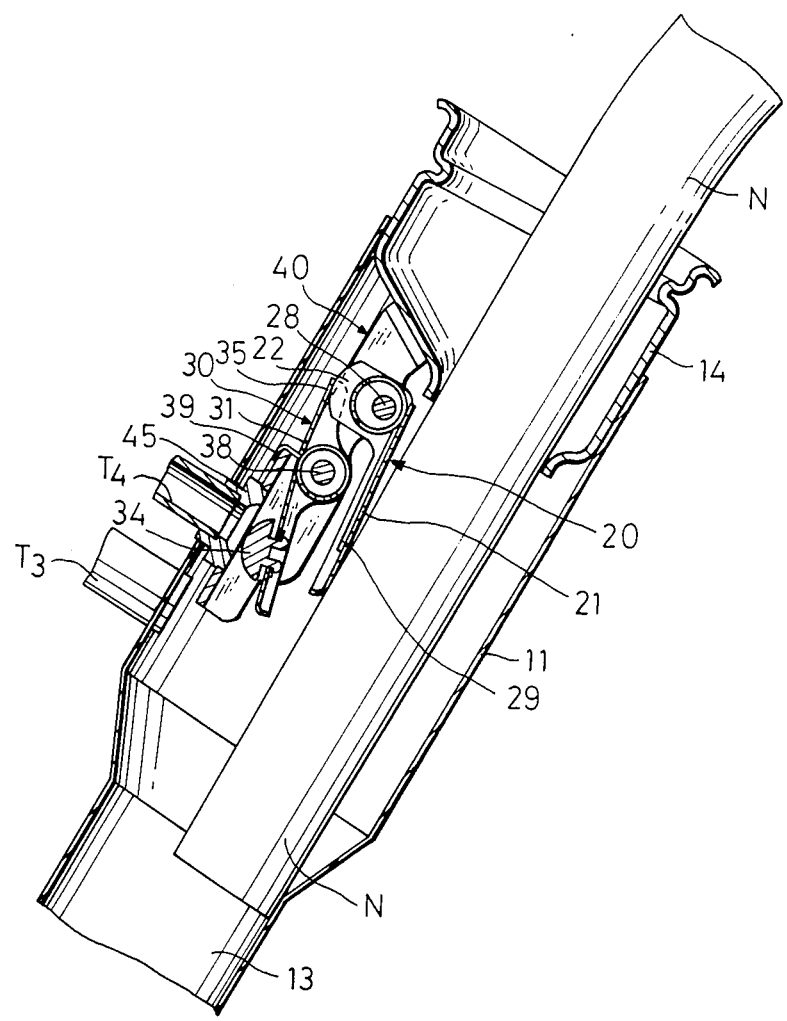
FIG. 4 is a longitudinal section similar to FIG. 1 but different therefrom in that the free end of a fuel supplying gun is inserted in the conduit so that the first valve member is actuated thereby to be open against the force of the coiled spring and the second valve member engaged with the first valve member is in turn actuated thereby to be open against the force of the concerned other coiled spring.

The lower conduit portion 13 to be connected with the reservoir F is not shown in FIG. 1 and also in FIG. 4 for the convenience sake by cutting off.

The valve means assembly of the invention comprises, in addition to said cylindrical member 14, a first valve member 20 normally gastightly closing the port defined by the lower open end of said member 14 and adapted to open when the tip end of a fuel supplying gun N (see FIG. 4) is inserted in the conduit from the upper end thereof, from which said cap is disengaged in advance; a second valve member 30 normally gastightly closing a hole formed in the circumferential wall of the conduit to which said tube $T_4$ is connected and adapted to be open by said actuated first valve member 20; and a bracket member 40 fixed to said cylindrical member 14 and for holding said first and second valve members to respectively angularly move, to readily form one assembly to be readily mounted in the fuel filler conduit.

Figure 5:
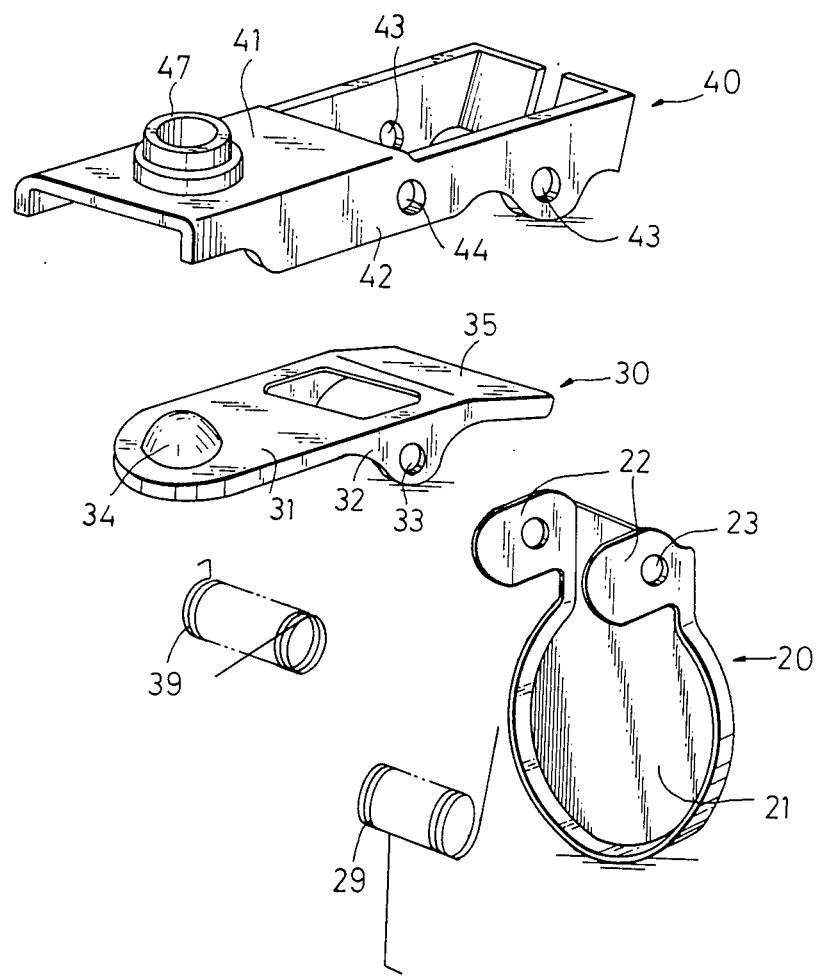
FIG. 5 is an exploded perspective view of a bracket member to be fixed to the fuel filler conduit, the first valve member pivoted on said bracket member for angular movement, the second valve member also pivoted on the bracket member so as to engage with said first valve member for angular movement and coiled springs respectively urging said valve members to be normally in closing positions.

As best shown in FIG. 5, the first valve member 20 comprises a pan-shaped body 21 of a diameter larger than that of the port or lower open end of the cylindrical member 14. The body 21 has a pair of brackets 22, 22 each projecting transversally to a plane of the body portion and being formed with a through hole 23 so that valve member 20 may angularly move about an axle passing through the opposite holes 23, 23 between the positions shown in FIGS. 1 and 4.

The second valve member 30 comprises an elongated plate body 31 having a pair of brackets 32, 32, each projecting transversally to a plane formed by body portion 31 at the middle of the elongation thereof and being formed with a through hole 33 so that member 30 may angularly move about an axle passing through opposite holes 33, 33, between the positions shown in FIGS. 1 and 4. At the vicinity of one end of elongated plate 31, a hemispherical member 34 is formed or mounted so as to play a role as the ball for the so-called ball-valve.

Figure 3:
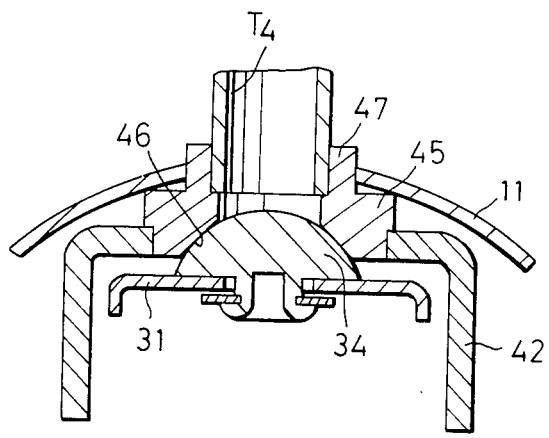
FIG. 3 is a section taken along a line III—III in FIG. 1 is an enlarged scale.

The bracket member 40 comprises a frame body 41 having side walls 42, 42, each having two through holes 43 and 44, one being for engagement with the first valve member by passing a pivot axle 28 through holes 23, 23 and 43, 43; while the other is for engagement with the second valve member 30 by passing a pivot axle 38 through holes 33, 33 and 44, 44. An annular member 45, which is formed with a valve seat 46 at one end thereof for engaging with the hemispherical protrusion 34 of second valve member (see FIG. 3) and a collar 47 at the other end to be connected with said tube $T_4$, is fitted is a hole formed in the bracket plate 41 at the vicinity of one end thereof.

In order to urge the first and second valve members 20, 30 to be normally kept in the respective closing positions shown in FIG. 1, coiled springs 29 and 39 (see FIG. 5) are mounted on the pivot axles 28 and 38.

When the separate members explained above and illustrated in FIG. 5 is assembled by passing the pivot axles respectively through the concerned holes as referred to above, the assembly is fixed at the tail end of the bracket member 40 to the slanted side wall of the eccentric cylindrical member 14 by any suitable means, for instance by spot welding, and then this further assembly is inserted in the upper conduit portion 11 so that the collar 47 of the assembled bracket member is exposed out of the conduit wall through a hole formed therein in advance.

In operation, when the nozzle gun N for supplying fuel to the reservoir in the vehicle is inserted in the conduit, the first valve member 20 is angularly moved about the axle 28 from the closing position of FIG. 1 to the open position of FIG. 4 against the force of the coiled spring 29, during which the ends of the brackets 22 to play a role of cams are contacted with a tail portion of the elongated plate body 31 so as to angularly move about the axle 38 from the closing position of FIG. 1 to the open position of FIG. 4 against the force of the coiled spring 39, whereby most of fuel vapour filled in the reservoir and the conduit is not released from the upper open end of the conduit but from the now open end of the tube $T_4$ to the canister $C_1$ as fuel is supplied through the nozzle gun N so as to raise the level thereof in the reservoir.

Because of the shape of the end of each bracket 23 and the position of the hole 23 or pivot axle passing therethrough the second valve member 30 is separated from the valve seat fairly rapidly at the early stage of the angular movement of the first valve member 20 but slowly at the later stage close to the position of FIG. 4. Thus, second valve member 30 is adapted not to hinder insertion of the nozzle N, and even if the diameter of the nozzle is small or when the inserting angle is not relevant second valve member 30 is sufficiently separated from the valve seat.

Since the valve members can be assembled with the bracket member and the cylindrical member so that the reliable performance thereof may be confirmed before mounting in the fuel filler conduit. It is preferable, however, to take a measure for assuring correct performance above all of the second valve member in the form of the ball valve, which will be explained in reference to FIGS. 7, 8 and 9, which may be applied not only to the fuel filler conduit but also to any other device requiring more compactness in comparison with the usual ball valve in which the ball is contained in the casing to be partly exposed out thereof and urged by spring means such as the coiled spring also mounted in the casing to be normally held in the position to abut on the valve seat.

Figure 7:
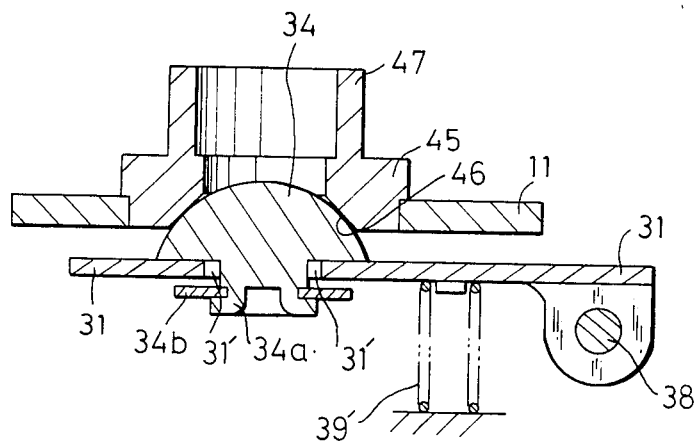
FIG. 7 is sectional view of a part of the second valve member together with a valve seat formed in an annular member fitted in a hole formed in the fuel filler conduit wall.
Figure 8:
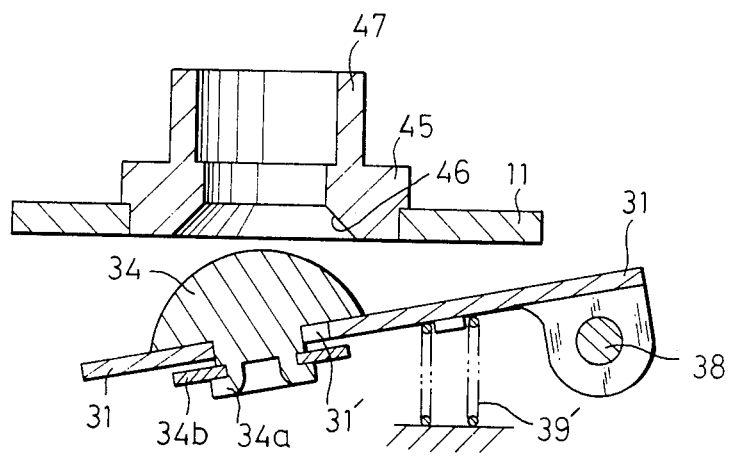
FIG. 8 is a similar view but showing the second valve member in the open position.

FIGS. 7 and 8 show the ball valve according to the invention respectively in the closing position and the open position.

The valve seat 46 is formed in the bottom of the annular member 45 which is fitted in the hole formed in the conduit wall 11. The annular member 45 has the collar 47 for the tube T4 as referred to above although such has not direct connection with the ball valve construction.

A leg 34a of the hemispherical body 34 is inserted in a hole formed in the elongated plate 31, which is pivoted 38 for angular movement, so as to leave a circumferential clearance 31' therearound. Leg 34a fitted with a ring 34b therearound is caulked at the free end to be outwardly expanded so that said hemispherical body 34 may freely move in any axial direction in the range of said play 31' without slipping out of the hole.

The elongated plate 31 is normally urged by spring means 39' to be kept in the closing position of FIG. 7 and angularly movable to the open position of FIG. 8 when a some force is affected on plate member 31 against the force of spring means 39'.

Figure 9:
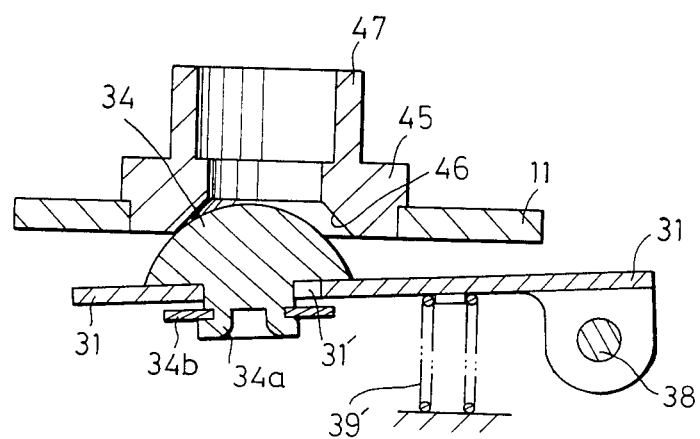
FIG. 9 is a section similar to FIG. 1 but showing how the semispherical body is automatically moved to the correct position relative to the valve seat.

When this some force is removed, the plate member 31 mounted with the hemispherical body 34 is angularly moved owing to the spring means 39' to be again in the position as shown in FIG. 7 to correctly abut on the valve seat, but ball valve 34 may incidentally fail to be in said correct position by some reasons as shown in FIG. 9.

Owing to the limited movability of the hemispherical body 34 in the axial direction relative to the plate member 34 and the force urging said body 34 onto the curved surface of the valve seat 46, it is appreciated that said ball valve 34 can automatically move to the correct position.

What is claimed is:

1. A fuel filler conduit connected with a fuel reservoir for the inner combustion engine at one end thereof and having the other open end normally closed by a cap, comprising a through hole formed in the circumferential wall of the conduit for outletting fuel vapour; first valve means normally urged by spring means to be in a position for closing a port leading to said other open end; and a second valve means normally urged by other spring means to be in a position for closing said fuel vapour outlet and so engaged with said first valve means that when a fuel supply nozzle is inserted in the conduit from said other open end said first valve means is opened by the tip of said nozzle against the force of said spring means, whereby said second spring means is opened against the force of said other spring means for allowing fuel vapour to pass through said outlet to be supplied to said engine for combustion.

2. The fuel filler conduit as set forth in claim 1, which further comprises a cylindrical member having an upper open end to be closed by said cap and a lower open end defining said port and a bracket member to be fixed at one end on the wall of said cylindrical member to be suspended downwards therefrom, said first valve means being pivoted on said bracket member for angular movement between said two positions, while said second means is pivoted also on said bracket member for angular movement between said two positions.

3. The fuel filler conduit as set forth in claim 2, in which said first valve means is in the form of a pan-shaped body of a diameter larger than that of said port and having a pair of transversally projecting brackets which are pivoted on said bracket member and said second valve means is in the form of an elongated plate body having a pair of brackets at the middle of the elongation to be pivoted on said bracket member so that one end portion thereof may abut on the free ends of said brackets of said first valve member and when said first valve member is angularly moved to be in the open position said second valve member is angularly moved to be in the open position by said abutment with the bracket ends playing a role as cams, said elongated plate body of the second valve member being provided with a hemispherical body on the other end portion so as to abut on a valve seat formed in an annular member fitted in said through hole for closing.

4. The fuel filler conduit as set forth in claim 3, in which said hemispherical body having a foot portion downwardly projected therefrom is mounted on said elongated plate body by inserting said foot in a hole of the diameter larger than that of said foot to leave a circumferential clearance around said foot so that said hemispherical body may freely move in the range limited by said clearance in any of the axial direction relative to said plate body.

* * * * *